(12) United States Patent
Kita et al.

(10) Patent No.: US 6,776,716 B1
(45) Date of Patent: Aug. 17, 2004

(54) GAME CONTROLLER, ENTERTAINMENT SYSTEM, GAME EXECUTION METHOD AND METHOD OF DOWNLOADING GAME SOFTWARE PROGRAM

(75) Inventors: Kazuhiro Kita, Kanagawa (JP); Takaaki Tobishima, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/762,841
(22) PCT Filed: May 25, 2000
(86) PCT No.: PCT/JP00/03367
§ 371 (c)(1), (2), (4) Date: Feb. 12, 2001
(87) PCT Pub. No.: WO00/76611
PCT Pub. Date: Dec. 21, 2000

(30) Foreign Application Priority Data

Jun. 14, 1999 (JP) .......................................... 11-167224
Apr. 14, 2000 (JP) ....................................... 2000-118514

(51) Int. Cl.⁷ ................................................. A63F 9/24
(52) U.S. Cl. .......................................... 463/37; 463/44
(58) Field of Search ........................... 463/1, 7, 30, 31, 463/32, 37, 38, 39, 40, 41, 42, 43, 44, 45

(56) References Cited

U.S. PATENT DOCUMENTS

| | | |
|---|---|---|
| 4,572,509 A | 2/1986 | Sitrick |
| 5,581,270 A | 12/1996 | Smith et al. |
| 5,618,045 A * | 4/1997 | Kagan et al. .................. 463/40 |
| 5,759,100 A | 6/1998 | Nakanishi |
| 6,028,866 A * | 2/2000 | Engel et al. ................. 370/461 |
| 6,241,610 B1 * | 6/2001 | Miyamoto et al. ............ 463/33 |
| 6,488,587 B1 * | 12/2002 | Furuichi et al. .............. 463/44 |
| 6,587,872 B2 * | 7/2003 | Hirasawa .................... 709/217 |

FOREIGN PATENT DOCUMENTS

| | | |
|---|---|---|
| EP | 0 835 676 | 4/1998 |
| GB | 2 274 068 | 7/1994 |
| WO | WO 97/10561 | 3/1997 |
| WO | WO 99/08231 | 2/1999 |

OTHER PUBLICATIONS

Patent Abstracts of Japan, 05177057, Jul. 20, 1993.
Patent Abstracts of Japan, 01250287, Oct. 5, 1989.
Patent Abstracts of Japan, 08294581, Nov. 12, 1996.

* cited by examiner

*Primary Examiner*—Kim Nguyen
(74) *Attorney, Agent, or Firm*—Frommer Lawrence & Haug LLP; William S. Frommer; Samuel L. Lee

(57) ABSTRACT

A game controller for an entertainment system coupled to a game machine body. The game controller comprises a key operation portion, communication interface means for establishing a communication with the game machine body, and storage means in which a plurality of game software programs is stored. A particular game software program is selected from the plurality of game software programs using the key operation portion. A control portion of the game machine body executes the particular game software program.

15 Claims, 17 Drawing Sheets

(A) 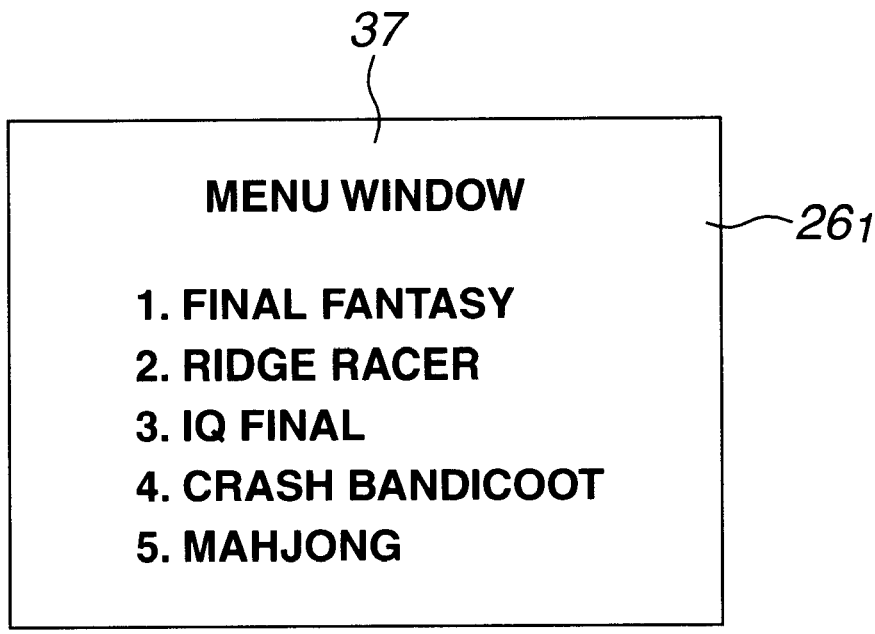
(B) 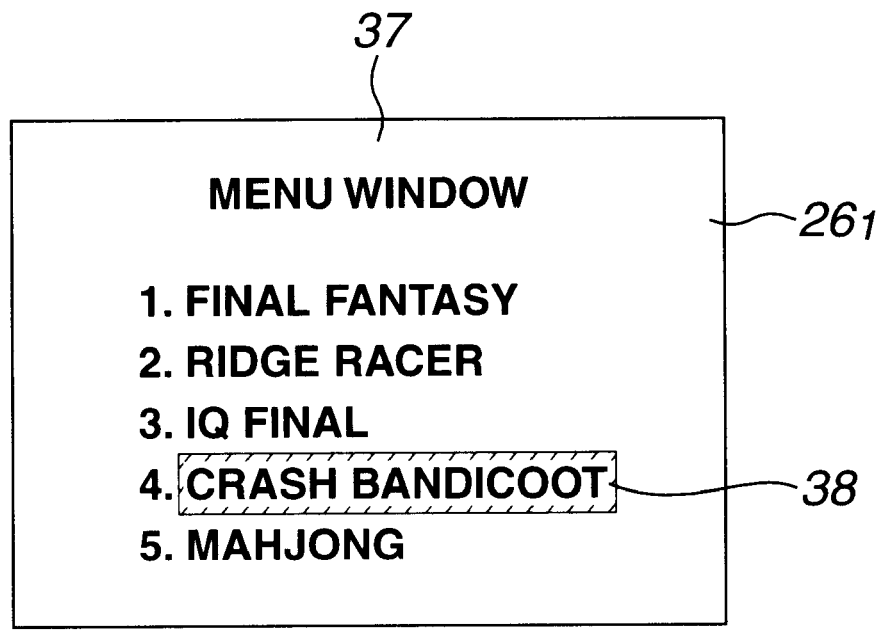
FIG. 7

(a)

GAME MENU

1. JAPANESE CHESS
2. MAHJONG

(b)

COMPETITION METHOD

1. COMPUTER
2. SPECIFIC PERSON
3. UNSPECIFIC PERSON

(c)

SPECIFIC PERSON

PLEASE INPUT SEAT NO.
OF COMPETITOR

UNSPECIFIC PERSON

A COMPETITOR
IS BEING DETECTED
PLEASE WAIT FOR A MOMENT

(e)

ASK TO PLAY THE GAME

ASK FOR GAME XX
FROM PERSON AT SEAT NO. XX
DO YOU ACCEPT IT ?

| YES | NO |

(f)

COMPETITOR
HAS BEEN FOUND

PERSON AT SEAT NO. XX
HAS ACCEPTED
TO PLAY THE GAME

COMMUNICATION LINE
IS CONNECTED TO GAME
UNIT OF SEAT NO. XX
PLEASE WAIT FOR A MOMENT

(h)

CONNECTION HAS BEEN
ESTABLISHED WITH GAME
UNIT OF SEAT NO. XX

YOU MAY INPUT
YOUR NICKNAME x  y  z a n d

(i)

GAME WILL NOW BE STARTED
PLEASE DEPRESS
THE START BUTTON

FIG. 12

| To addreess | From address | Byte count | Command code | Data | Check sum |

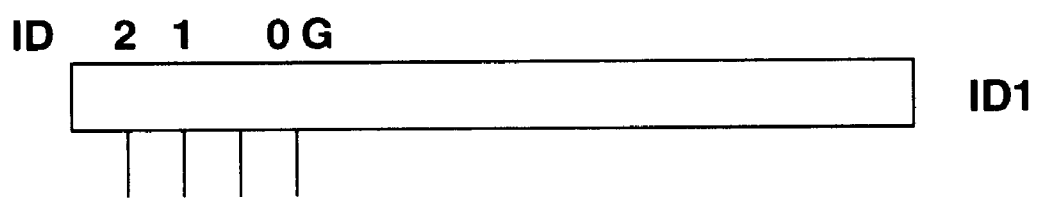
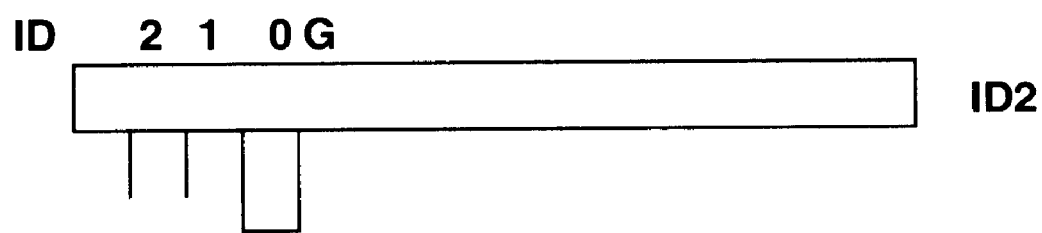
FIG. 17

(a)

GAME CONTROLLER MAINTENANCE

1. DOWNLOAD
2. ERASE (b)

LIST OF GAME

3. JAPANESE CHESS
4. CHESS
5. HORSE RACING
6. BASEBALL

DECISION (c)

NOW DOWNLOADING

COMPLETED BY 50%

(d) LIST

| ID NO. | TITLE 1 | TITLE 2 | TITLE 3 | TITLE 4 | TITLE 5 |
|---|---|---|---|---|---|
| 1 | JAPANESE CHESS | CHESS | POKER | MAHJONG | BASEBALL |
| 2 | CHESS | SOLITAIR | POKER | MAHJONG | BASEBALL |
| 3 | JAPANESE CHESS | CHESS | SOLITAIR | MAHJONG | BASEBALL |

(e) ERASE CHESS

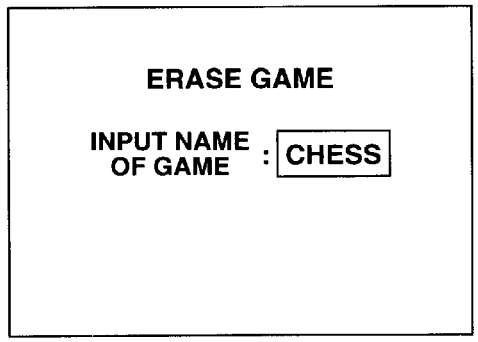

ERASE GAME

INPUT NAME OF GAME : CHESS

(d) CHESS IS SELECTED

| ID NO. | TITLE 1 | TITLE 2 | TITLE 3 | TITLE 4 | TITLE 5 |
|---|---|---|---|---|---|
| 1 | JAPANESE CHESS | CHESS | POKER | MAHJONG | BASEBALL |
| 2 | CHESS | SOLITAIR | POKER | MAHJONG | BASEBALL |
| 3 | JAPANESE CHESS | CHESS | SOLITAIR | MAHJONG | BASEBALL |

(f) CHECK DIALOGUE

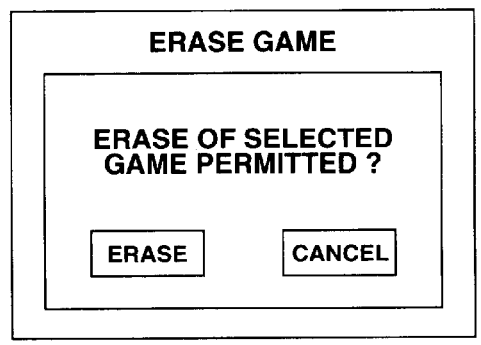

ERASE GAME

ERASE OF SELECTED GAME PERMITTED ?

ERASE    CANCEL

FIG. 19

GAME CONTROLLER, ENTERTAINMENT SYSTEM, GAME EXECUTION METHOD AND METHOD OF DOWNLOADING GAME SOFTWARE PROGRAM

DESCRIPTION

1. Technical Field

The present invention relates to a game controller for use to play a video game displayed on, for example, a monitor, such as a television set, entertainment system incorporating the game controller and a game machine body and a game execution system. The present invention relates to a method of downloading a game software program to the game controller.

2. Background Art

In movable bodies, such as airplanes and trains, and hotels, service has become widespread with which video game software is provided for a passenger or a lodger for each of seat or a room. A provided entertainment system is used to play a video game. A requested video game or software is distributed or provided for the passenger or the lodger at each seat or in each room by using a removable media, such as CD-ROM, a communication media, such as a network.

When the video game software is distributed with the removable media, a plurality of the same title games must be provided. Therefore, a great load must be borne by the administration side. Since one CD-ROM is able to store only one video game software, each CD-ROM must be lent for a passenger who requires to play a plurality of games. Also the foregoing case causes the administrating side to bear a load.

When video game software is distributed through a network, the load which must be borne by the distributing side when, for example, the software is distributed by the CD-ROM can be eliminated. Usually, the size of the program of the video game software is very large. Therefore, an excessively long time is required to download the software when a low-cost network is used.

An entertainment system of a type which requires a plurality of game software programs having the same title to be prepared does not permit passengers at distant seats of a movable body, such as an airplane or a train, to play a competitive-type game, such as the Japanese chess or the chess.

When video game software is distributed through a network, a costly network is required when passengers at distant seats play the competitive-type game.

In view of the foregoing, an object of the present invention is to provide a game controller which permits a passenger or a lodger to select video game software to immediately play the video game such that a load which must be borne by the administrating side is reduced, an entertainment system incorporating the game controller, a method of executing the game and a method of downloading game software to the game controller.

Another object of the present invention is to provide an entertainment system and a method of executing a game with which passengers of a movable body at distant seats to play a competitive-type game.

DISCLOSURE OF THE INVENTION

To achieve the foregoing objects, a game controller according to the present invention comprises: a key operation portion; communication interface means for establishing the communication with a game machine body; and storage means in which a plurality of game software programs are stored which have been selected by using the key operation portion and which are executed by a control portion of the game machine body.

To achieve the foregoing objects, an entertainment system according to the present invention comprises: a game controller; and a game machine body, wherein the game controller incorporates a key operation portion; communication interface means for establishing the communication with a game machine body and storage means in which a plurality of game software programs are stored which have been selected by using the key operation portion and which are played by a control portion of the game machine body, and the game machine body incorporates communication interface means for establishing the communication with the game controller and control means for executing a plurality of game software programs selected by using the key operation portion.

To achieve the foregoing objects, a method of executing a game comprises: a step for displaying a list of an index of a plurality of game software items on a display portion when a game controller incorporating a storage medium having a plurality of game software items stored therein is connected to a game machine body; a step for selecting one game software item from the index list of the plural game software items displayed on the display portion by using a key operation portion of the game controller; and a step for executing one game software item selected from the display portion by using the key operation portion of the game controller.

To achieve the foregoing objects, an entertainment system according to the present invention comprises: a plurality of game machine bodies to each of which a game controller is connected; a network for connecting the plural game machine bodies to one another; and a main control portion for controlling the plural game machine bodies through the network, wherein the game controller incorporates a key operation portion, communication interface means for establishing the communication with the game machine body and storage means having a plurality of game software programs stored therein and selected by using the key operation portion, the game machine body incorporates communication interface means for establishing the communication with the game controller and control means for executing the plural game software program game software program selected by using the key operation portion of the game controller, and when communication has been established between at least two game machine bodies of the plural game machine bodies, and a predetermined game software program is executed by the main control means such that synchronization is established.

To achieve the foregoing objects, a method of executing a game according to the present invention such that a network for connecting a plurality of game machine bodies to which a game controller is connected is used to execute a predetermined game software program between an arbitrary game machine body and an unspecific game machine body, the method of executing a game comprising: a step for transmitting a request for playing a game to all of residual game machine bodies when a predetermined game software program has been selected by the game controller connected to the arbitrary game machine body and a mode for retrieving an unspecific competitor has been selected; a step for connecting a communication line between the arbitrary game machine body and the unspecific game machine body when an acceptance notice has been issued from the unspecific competitor through the unspecific game machine body in response to the request for playing the game; and a step for playing the game while synchronization between the game machine bodies is being established such that the unspecific game machine body fetches, from the game controller, a game software program similar to the game software program which is executed by the arbitrary game machine body and the game machine body turns the game software program on.

To achieve the foregoing objects, a method of downloading a game software program to a game controller incorporating a storage portion, the method of download a game software program comprising the steps of: connecting the game controller to a large-capacity storage medium having the game software program stored therein; and executing download.

BRIEF DESCRIPTION OF DRAWINGS

FIG. 7 is a diagram showing a menu screen;

FIG. 10 is a diagram showing an example of display on a monitor of a game machine realized during the application program is executed;

FIG. 11 is a diagram similar to FIG. 10 and showing an example of display on the monitor of the game machine realized during the application program is executed;

FIG. 12 is a diagram similar to FIG. 11 and showing an example of display on the monitor of the game machine realized during the application program is executed;

FIG. 17 is a diagram showing a method of setting the ID of SCSI I/F of the download system shown in FIG. 16;

FIG. 19 is a diagram showing another example of display (erase) on the monitor of the PC realized when the download application program has been executed by the download system shown in FIG. 16.

BEST MODE FOR CARRYING OUT THE INVENTION

Embodiments of the present invention will now be described with reference to the drawings. In this embodiment, a video game system will now be described as an example of an entertainment system according to the present invention and incorporating game controllers according to the present invention. The video game system according to the present invention is used in an airplane.

Figure 1:
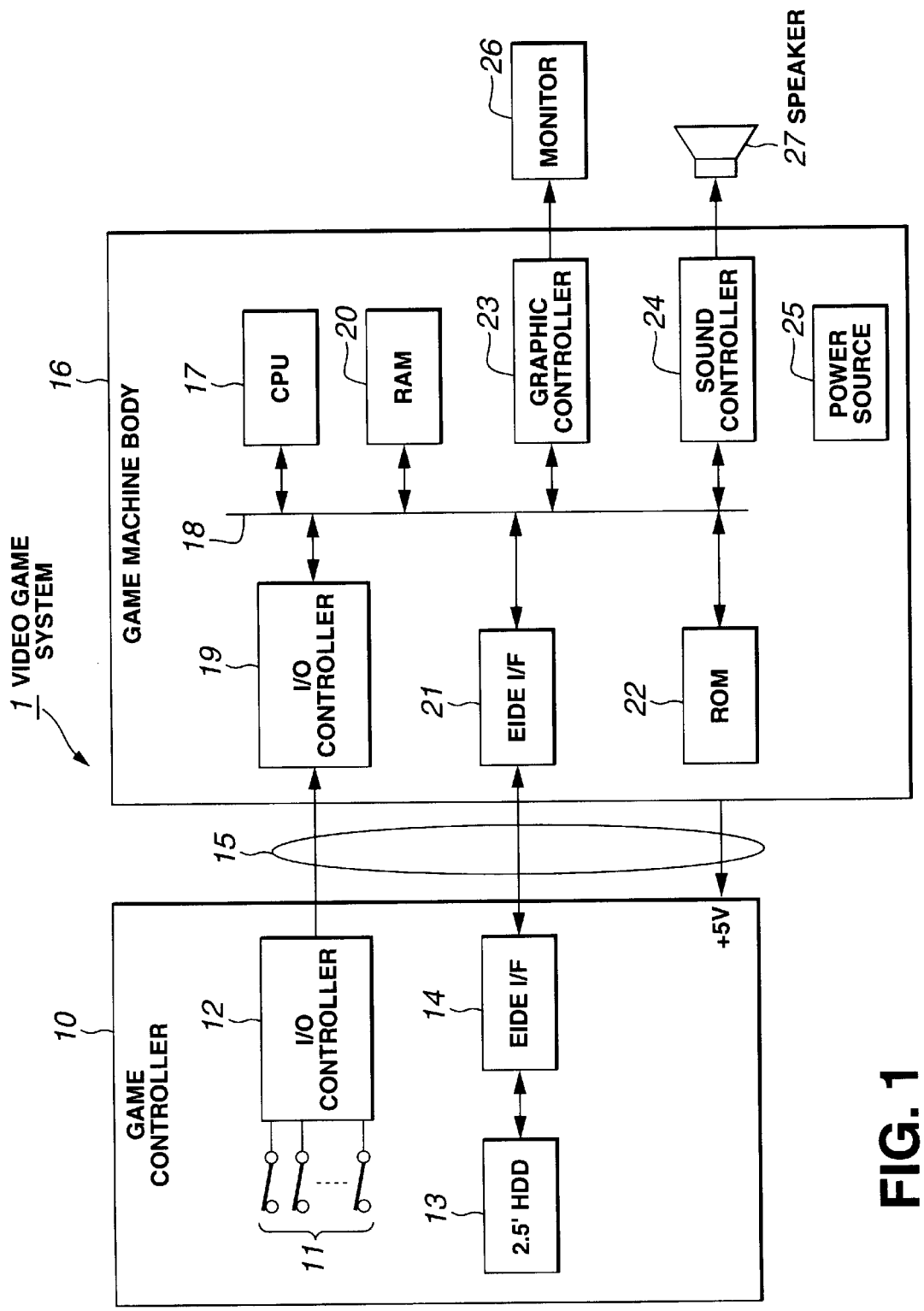
FIG. 1 is a block diagram showing the electrical structure of a video game system according to an embodiment of the present invention.

As shown in FIG. 1, a video game system 1 for use an airplane incorporates a game controller 10; and a game machine body 16 to which the game controller 10 is connected through cables 15. Also a monitor 26 and a speaker 27 are connected to the game machine body 16. The game controller 10 includes a small-size HDD 13 (2.5'). The HDD 13 drives a HD having a storage capacity of 6 GB. Since a usual game title has a capacity of 500 MB, the HD of the HDD 13 is able to store 10 titles. The recording medium is limited according to the size of the program to be recorded. The recording medium may be another medium, such as a flush disc or a semiconductor recording medium. The foregoing recording medium may be a removable medium.

Figure 2:
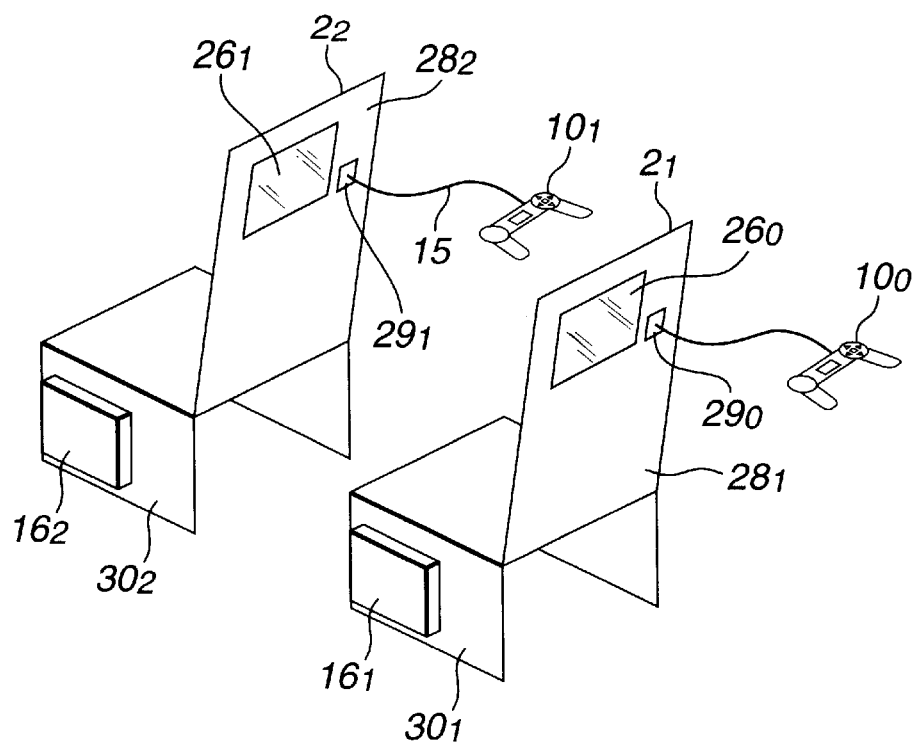
FIG. 2 is a diagram showing the shape of the video game system.

As shown in FIG. 2, the game controller 10, the game machine body 16 and the monitor 26 of the video game system may be disposed in the periphery of a seat 2 in an airplane. For example, a passenger at a seat $2_1$ executes a video game while viewing a monitor $26_1$ such that a game controller $10_1$ is joined to a connector $29_1$ provided for a seat back $28_2$ of the forward seat $2_2$ through the cables 15. The game machine body $16_1$ is joined to a lower portion $30_1$ of the seat $2_1$. The cable is connected to the connector $29_1$ of the seat back $28_2$ of the forward seat $2_2$ through the seat and the floor. A video output from the game machine body $16_1$ and an input to the game controller $10_1$ are supplied to the monitor $26_1$ of the front seat $2_2$ and the connector $29_1$ disposed at the side of the monitor $26_1$. Note that the seat back $28_1$ of the seat $2_1$ is provided with a monitor $26_0$ for a passenger in the rearward seat (not shown). A game controller $10_0$ is joined to the connector $29_0$. A game machine body $16_2$ for a passenger who takes the seat $2_2$ is joined to the lower portion of the seat $2_2$.

Figure 3:
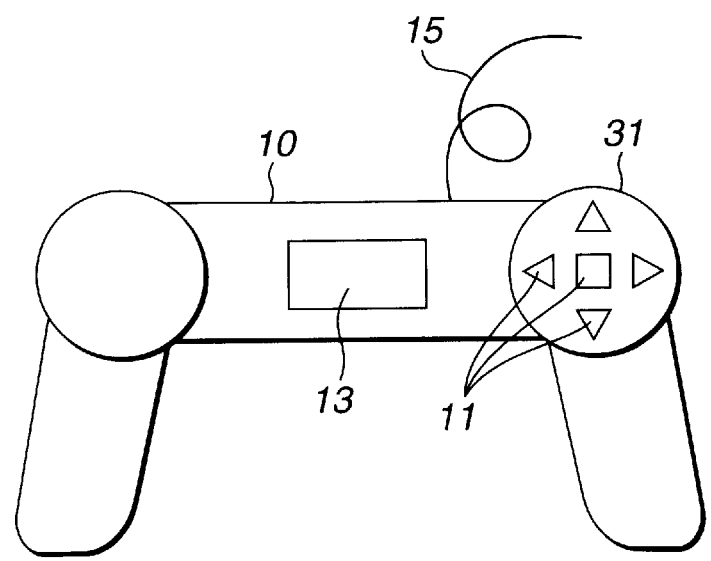
FIG. 3 is a diagram showing the shape of a game controller constituting the video game system.

As shown in FIGS. 1 and 3, the game controller 10 incorporates an operation surface 31 provided with buttons, such as a switch 11, and including an I/O controller 12, a 2.5-inch HDD 13 and an EIDE (Enhanced IDE) interface 14.

The I/O controller 12 is joined to the operation surface 31 of the game controller 10. Information items of the switch 11 and so forth are collectively interfaced with the game machine body 16. The EIDE interface 14 serves as an interface with the 2.5-inch HDD 13. The 2.5-inch HDD 13 has a capacity of 6 GB as described above which permits 10 titles of video game sandwich programs each having a capacity of 500 MB.

The game machine body 16 includes a CPU 17 to which a RAM 20, a ROM 22, a graphic controller 23, a sound controller 24, an I/O controller 19 and an EIDE interface 21 are connected through an internal bus 18.

The CPU 17 executes a game in accordance with a video game program read from the HDD 13. The RAM 20 is used when the CPU 17 executes the video game program. The ROM 22 has a basic program corresponding to an operation system (OS) stored therein.

The graphic controller 23 produces a polygonal image or a 3D image in accordance with data supplied from the CPU 17 to output the image to the monitor 26. The sound controller 24 synthesizes sound effect in accordance with data supplied from the CPU 17 to output the sound effect to the speaker 27.

As described above, the HDD 13 included in the game controller 10 is usually able to store 10 titles of video game programs. A program download system will schematically be described with reference to FIGS. 4 and 5.

Figure 4:
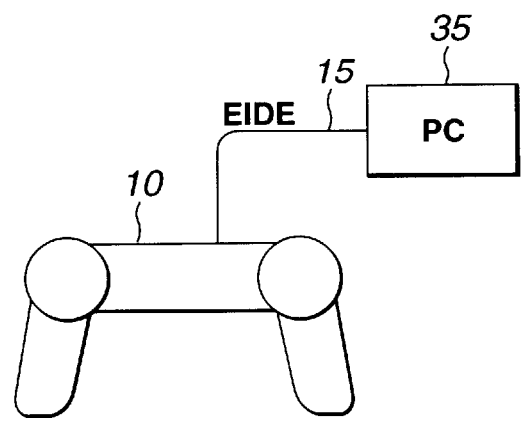
FIG. 4 is a diagram showing an example of download of a game software to the game controller.

FIG. 4 shows a download system in which a PC 35 is connected to the game controller 10 through the cables 15. Since the interface is similar to that for a usual PC, direct connection of the PC 35 as shown in the drawing enables a download system to be constituted.

Figure 5:
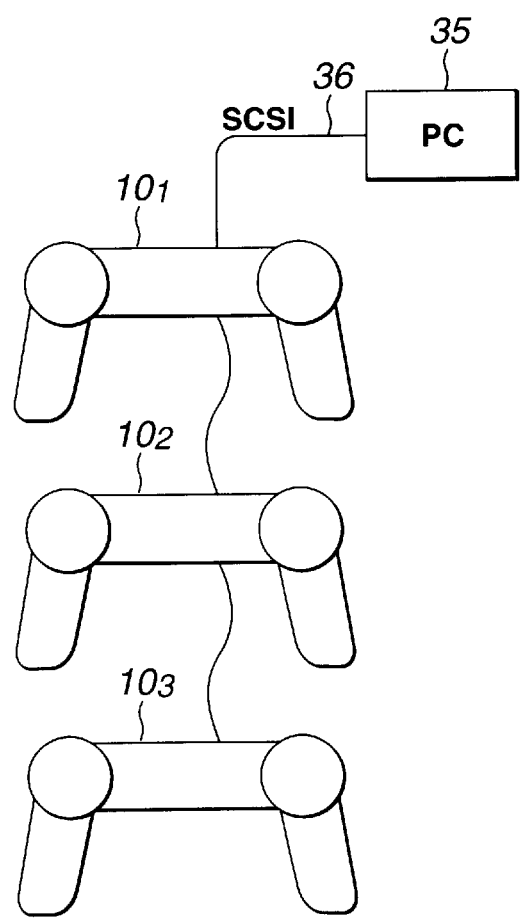
FIG. 5 is a diagram showing another example of download of a game software to the game controller.

When a SCSI cable 36 is employed for the HDD interface as shown in FIG. 5, a plurality (three in the drawing) of game controllers $10_1$, $10_2$ and $10_3$ can be connected to one PC 35 to permit simultaneous download. When the SCSI method is employed to establish the connection, connection of seven game controllers 10 is permitted. A method of downloading a game software program to the game controller will be described later.

Figure 6:
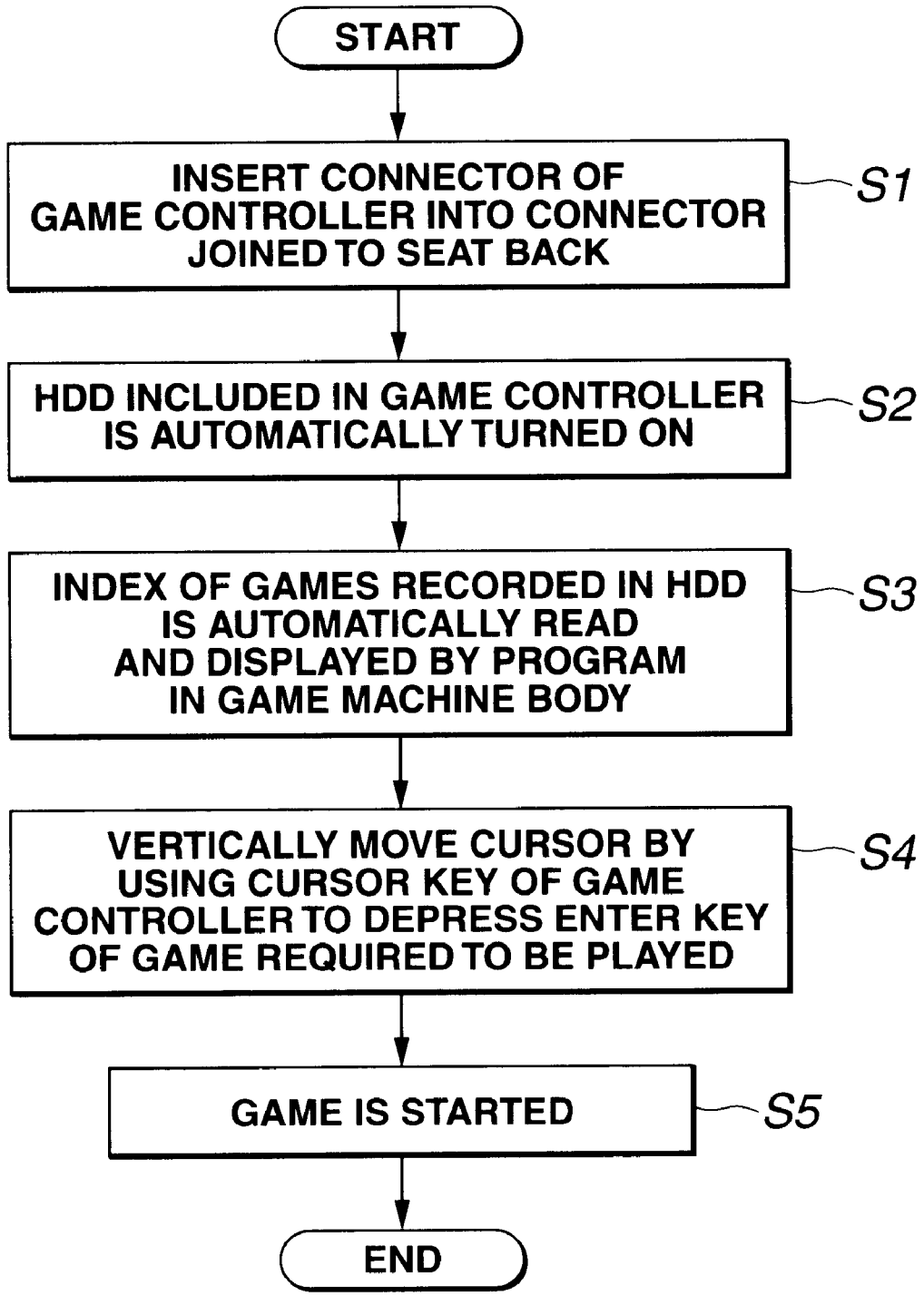
FIG. 6 is a flow chart of the operation of the video game system.

The procedure of the game controller 10 required to be performed from a moment at which a passenger lends the game controller 10 to which the game software program has been downloaded to a moment at which the game is started after the connector is connected to a connector 29 disposed at the side of the monitor $26_1$, will now be described with reference to a flow chart shown in FIG. 6. Note that the description of the download to the description of the following flow chart is an embodiment of a method of executing a game according to the present invention.

In step S1 the cursor of the game controller 10 is inserted into the connector 29 joined to the seat back $28_2$. Then, the HDD 13 included in the game controller 10 is automatically turned on in step S2.

In step S3 the index of, for example, five titles of video games recorded in the HDD 13 is automatically read in accordance with the basic program (the operating system) for the game machine body 16. As shown in FIG. 7(A), a menu screen 37 is displayed on the monitor $26_1$. That is, the list of names of the games is displayed on the monitor 26. Note that the display of the list, which is performed by displaying names, may be performed by displaying icons. That is, an index which permits the identification of the games.

In step S4 a cursor key of the game controller 10 vertically mosses a cursor 38. When an enter key has been depressed at the title position of the video game required to be played, the selected game is started in step S5. In this description, "Crash Bandicoot" given #4 is started.

When game is required to be completed, a game completion button in the switch 11 of the game controller 10 is depressed. Thus, the menu screen 37 is again displayed. In the foregoing state, the cables 15 of the game controller 10 can be removed from the connector 29.

Whenever the game controller 10 is removed, the game machine body 16 resets all of the video games to start a standby mode.

As described above, the video game system according to this embodiment has the structure that the game controller 10 has a plurality of game software programs stored therein. Therefore, the passenger is able to freely select a game. Since the games are stored in the game controller 10, any administration of the game software is not required in the airplane or the like. Since any marketed CD-ROM is not used, any burglar can be prevented.

Another embodiment of the entertainment system incorporating the game controller according to the present invention will now be described. In this embodiment, also a video game system will now be described which is used in an airplane.

Figure 8:
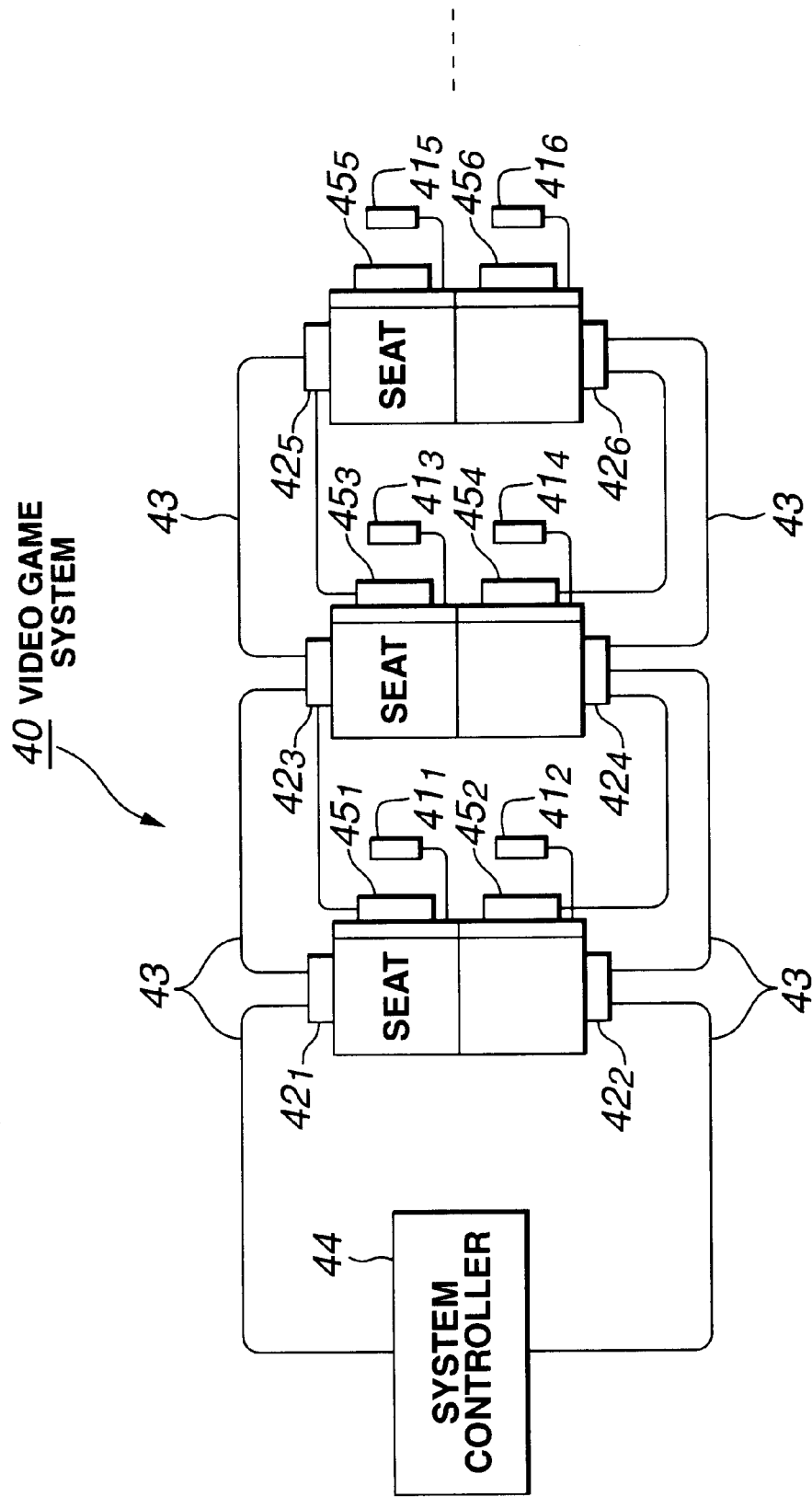
FIG. 8 is a schematic view showing the structure of a video game system according to another embodiment of the present invention.

As shown in FIG. 8, the video game system according to this embodiment is a system in which a plurality of game machine bodies $42_1$, $42_2$, $42_3$, $42_4$, $42_5$, $42_6$, . . . , to which a plurality of game controllers $41_1$, $41_2$, $41_3$, $41_4$, $41_5$, $41_6$, . . . , are connected are connected to one another through a network 43 and controlled by a system controller 44 through a network 43. The game controller 41 and the game machine body 42 have similar structures as the game controller 10 and the game machine body 16 shown in FIG. 1. Therefore, the description of the internal structures are omitted. The passengers play a game while looking monitors $45_1$, $45_2$, $45_3$, $45_4$, $45_5$, $45_6$, . . . .

The game machine body 42 joined in the lower portion of a side portion of each seat as shown in FIG. 2 is connected through a network 43, as shown in FIG. 8. Moreover, the game machine body 42 is connected to an upper system controller 44. Originally, the network 43 is used by the upper system controller 44 performs communication with the lower game machine body 42 to control the overall system. In this embodiment, when a plurality of passengers play a game, the network 43 is used to establish the communication between the game machine bodies 42 to play the game.

The game machine body 42 structured similarly to the game machine body 16 shown in FIG. 1 is controlled by the system controller 43 to execute the following application program to start a competitive-type game. The procedure for staring the competitive-type game by using the application program will now be described with reference to FIGS. 9 to 12. Although the procedure for playing the competitive-type game will now be described, the structure according to this embodiment may be applied to a case where, for example, a role-playing game is played in which a plurality of persons are able to take part.

Figure 9:
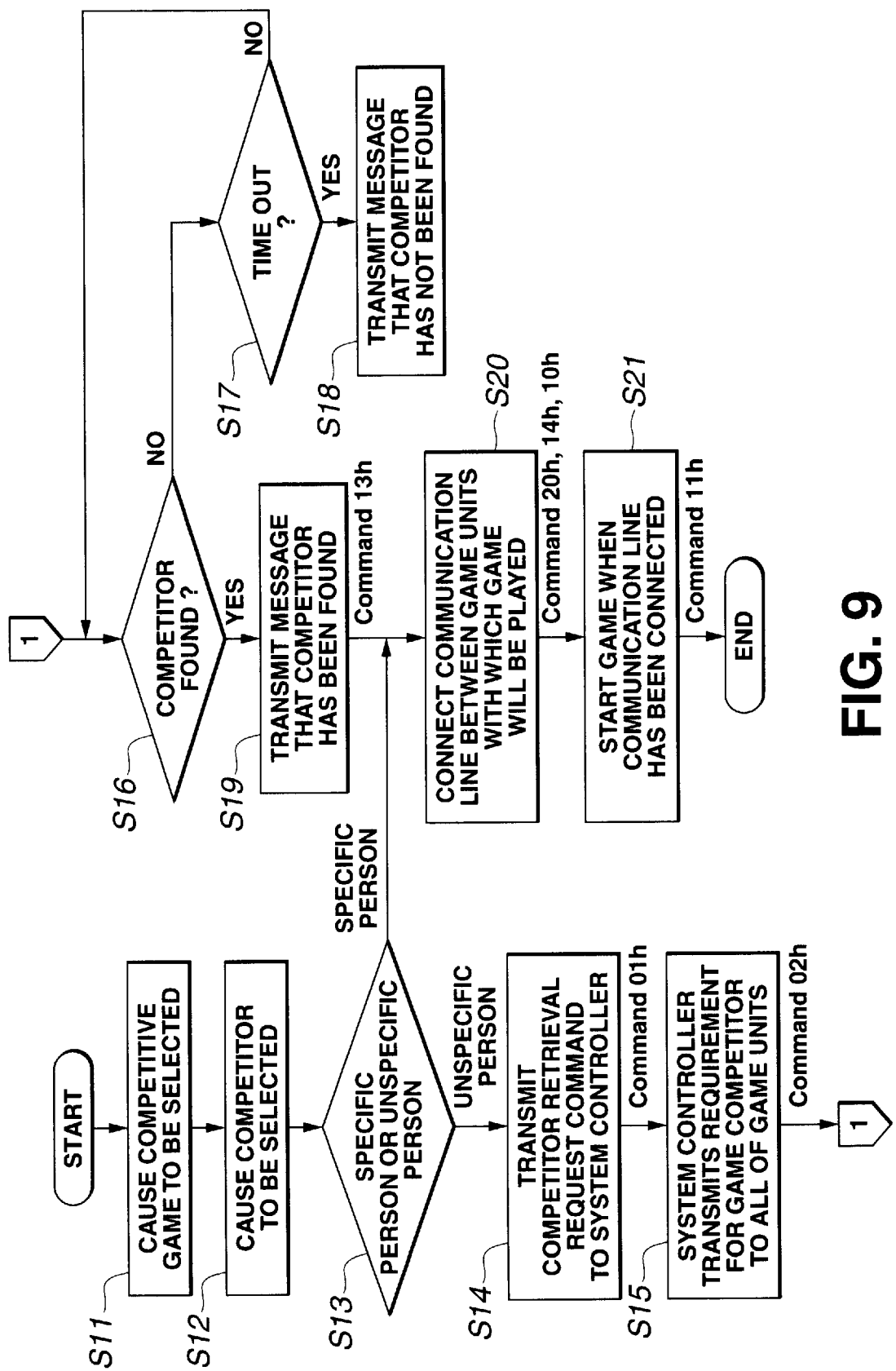
FIG. 9 is a flow chart showing an application program for performing a process required to start a competitive-type game which is performed by the video game system.

FIG. 9 is a flow chart showing the procedure of the application program. FIGS. 10 to 12 show examples of display on the monitor when the foregoing application program is being performed.

When the application program has been selected by an arbitrary passenger (hereinafter called a "request side" in accordance with the basic software program, the request side is caused to selected a competitive-type game in step S11 shown in FIG. 9. Specifically, "1. Japanese chess" and "2. mahjong" which are competitive-type games are displayed on the monitor 45 as a game menu, as shown in FIG. 10(a). An assumption is made that "1. Japanese chess" has been selected. In step S12 a competitor is selected. As shown in FIG. 10(b), a competition methods "1. computer", "2. specific person and "3. unspecific person" are displayed on the monitor 45. An assumption is made that "2. specific person" has been selected.

In step S13 a determination is made that the selected competitor is "2. specific person" or "3. unspecific person". Since, for example, "2. specific person" is selected in step S12, display "please input seat number of the competitor" is displayed on the monitor as shown in FIG. 10(c). Thus, the request side is caused to input the seat number. Then, the operation proceeds to step S20. The process in step S20 will be described later.

When "3. unspecific person" has been selected as the competitor in step S12, the "unspecific person" is determined in step S13. Then, the operation is branched to step S14. In step S14 a competitor retrieval request command is sent to the system controller 44. Thus, "a competitor is being detected, please wait for a moment" is displayed on the monitor 45, as shown in FIG. 11(d). When the system controller 44 has received the competitor retrieval request command in step S15, the system controller 44 sends a game competitor request command to all of the game machine bodies 42. Thus, the game machine bodies except for the game machine body which has sent the competitor retrieval request command receive the competitor request command from the system controller 44. A message for asking the game "ask for game xx from person at seat No. xx. Do you accept it?" is displayed on the monitor 45 as shown in FIG. 11(e). Thus, whether or not the passenger plays the game is selected by moving the cursor to either of "Yes" or "No" displayed on the monitor and by operating the enter key. The foregoing operations are used to determine whether or not the competitor has been detected in step S16. When a determination is made in step S17 that no input has been made for a predetermined time, a determination is made that the passenger does not want to play the game. Then, the operation proceeds to step S18 to send a message to the game machine body 42 of the request side which has required to play the competitive-type game, the message being a message having the content that "no competitor was found".

When "Yes" has been selected on the monitor shown in FIG. 11(e) by using the cursor or the like and a fact that a person who wants to play the game has been determined, the foregoing fact is sent to the system controller 44. The system controller 44 determines that the competitor has been found in accordance with the determination made in step S16. Then, the operation proceeds to step S19 so that a message having the content that the competitor has been detected is sent to the request side which has detected the competitor of the competitive-type game. Moreover, the seat number who has accepted the request is sent to the game machine body 42 of the request side. Thus, "competitor has been found" and "person at seat No. xx has accepted to play the game" are displayed on the monitor 45 of the request side, as shown in FIG. 11(f).

In step S20 the communication line between the game machine bodies 42 with which the game will be played is connected because the competitor has been determined. As shown in FIG. 12(g), "Communication line is connected to game unit of seat No. xx. Please wait for a moment" is displayed on the monitor 45 of the request side. When the communication line has been connected in step S21, "Connection has been established with game unit of seat No. xx" is displayed on the monitor, as shown in FIG. 12(h). Moreover, "You may input your nickname" is display to permit input of the nickname. While displaying a character string on the monitor, the cursor and the enter key are used to select characters to input the nickname. In step S21 the game software program of the competitor is turned on. When both of the game software programs have been turned on, "game will now be started. Please depress the start button" is displayed on the monitor 45 as shown in FIG. 12(i). Then, the game is played such that synchronization between the game machine bodies are established. As a matter of course, a fact that "You may input your nickname" is displayed on the competitor side. Thus, the nickname is input by performing selection using the cursor key and the decision key.

Figures 13, 14:
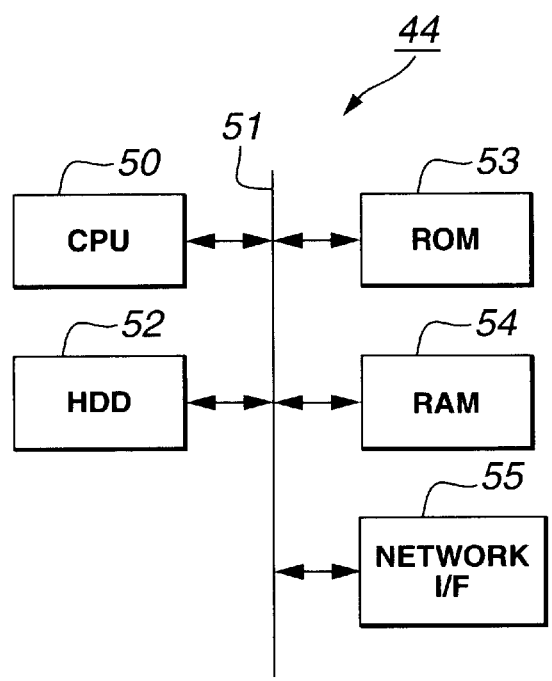
FIG. 13 is a block diagram showing the structure of a system controller.
FIG. 14 is a diagram showing the protocol of data which passes through a network of the video game system shown in FIG. 8.

As shown in FIG. 13, the system controller 44 incorporates a CPU 50 to which a HDD 52, a ROM 53, a RAM 54 and a network I/F 55 are connected through an internal bus 51. The CPU 50 executes an operating system program read from the HDD 52 or the ROM 53. When an application program concerning the method of executing a game according to the present invention has been selected by the game machine body 42 of the request side owing to the process of the operating system program, the application program is fetched from the HDD 52 to the RAM 54 so as to be executed by the CPU 50.

The application program causes the synchronization to be established between the game machine bodies 42. At this time, data conforming the protocol shown in FIG. 14 is communicated through the network 43 among the system controller 44 and the game machine bodies 42. In FIG. 14, the address (To address) of the transmission side and the address (From address) of the receiver side is expressed by Axx, where A indicates the seat row which is expressed by A–K. When the seat row A is Z, the address of the system controller 44 is indicated. The residual portion xx indicates the residual seat rows which are expressed by 1–99. When the seat row xx is 00, a broadcast is indicated with which data is commonly sent to all of the seats. Byte count follows the address (From address) of the transmission side to indicate the number of bytes of data following a command and code following the byte count. The command code is required to establish the synchronization so as to play the competitive-type game. Command codes 01h to 04h are used to detect the competitor. Specifically, 01h serves as a game competitor retrieval request command code, 02h serves as a game competitor request command code, 03h serves as a game competitor request status; Yes command code and 04h serves a game competitor request status; No command code. Command codes 10h to 14h are used to turn a game of the game machine body on after the competitor has been decided. Specifically, 10h serves as a game select command code, 11h serves as a game start command code, 12h is a game stop command code, 13h is a send message command code for sending a message, such as "Competitor has been decided" and 14h serves as a send nickname command code for sending nickname. Moreover, 20h serves as a contact communication line command code for connecting the communication line. Command 30h game machine body is a capsule command to directly send data following the command to the game software. Usually, the capsule command s used to communicate commands for use in the game. The foregoing command eliminates a necessity for producing a protocol for each game in a case where a plurality of games are installed.

Referring to a flow chart shown in FIG. 9, the process which is performed in step S14 to send a competitor retrieval request command to the system controller 44 is performed such that the command code of the foregoing protocol is Command 01h. In a process (the system controller sends the game competitor request to all of the game machine bodies) which is performed in step S15, the command is Command 02h. When "Yes" or "No" has been selected by using the cursor and the enter key with the display (ask to play the game) on the monitor shown in FIG. 11(e), the command code of the foregoing protocol is Command 03h or 04h. The message indicating a fact that a competitor has been detected is sent by Command 13h. The content of the message is described in a Date region. To connect the communication line between the game machine bodies in step S20, the communication line is connected by using Command 20h. Command 14h is used to send nickname, and command 10h is used to select a game. When the game is started in step S21, Command 11h is used.

Figure 15:
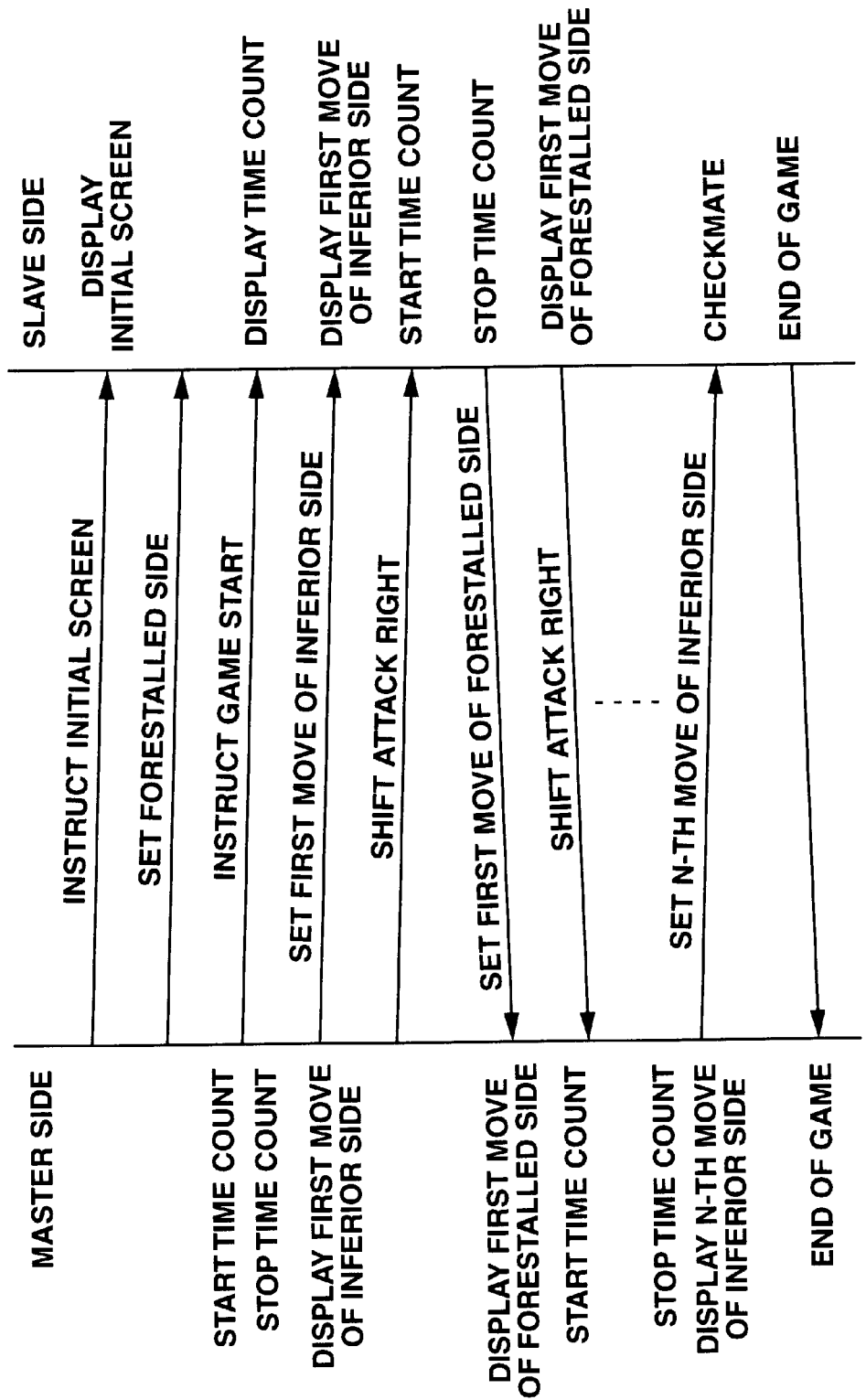
FIG. 15 is a diagram showing an example of the opening which is established when a competitive-type game (a Japanese chess) is performed.

An example of communication will now be described with reference to FIG. 15, which is established when a competitive-type game (for example, Japanese chess) is played between the request side (the master) and the competitor (the slave) after the process which is required before the competitive-type game is started in accordance with the application program included in the flow chart shown in FIG. 9.

An initial screen instruction is issued from the master in accordance with the capsule Command 30h. Then, setting the slave to be the forestalled side is performed by the master by using the capsule Command 30h. In the following processes, the capsule Command 30h is used. Then, the master issues a game start instruction. Simultaneously, time count on the master side is started. As a matter of course, the foregoing time count is displayed on the monitor of the slave as well as that of the master. When the master performs a first move as the inferior side during the foregoing time count, time counting is interrupted. The set data of the first move of the inferior side is sent by using the capsule Command 30h. Then, the slave displays the first move as the inferior side on the monitor. At this time, the right of attack is shifted from the master to the slave by using the capsule Command 30h. Thus, time count on the slave side is started. When a first move of the forestalled side is performed by the slave during the foregoing time count, time counting is interrupted. Then, set data of the first move of the forestalled side is sent to the master by using the capsule Command 30h. Thus, the first move of the forestalled side is displayed on the monitor of the master. At this time, the right of attack is shifted from the slave to the master. Then, time counting on the master side is started. Then, checkmate is decided, the foregoing sequential process is repeated. When the checkmate has been decided, the game is completed.

As described above, the entertainment system shown in FIG. 8 enables passengers at the distant seats to play the competitive-type game, such as Japanese chess or a chess. In the foregoing case, the game software programs have been stored in the game controller which is connected to the game machine body. The system controller performs control to cause the game to be played such that the synchronization is established by using protocol data, as shown in FIG. 14. Therefore, any costly network having a large transmission capacity is not required.

A method of downloading the game software program to the game controller which has schematically described with reference to FIGS. 4 and 5 will now be described with reference to FIGS. 16 to 20.

The game controller having a small size (2.5') as described above includes the HDD having a storage capacity of, for example, 6 GB. Therefore, 10 titles of game software programs each having a capacity of 500 MB can be stored.

Figure 16:
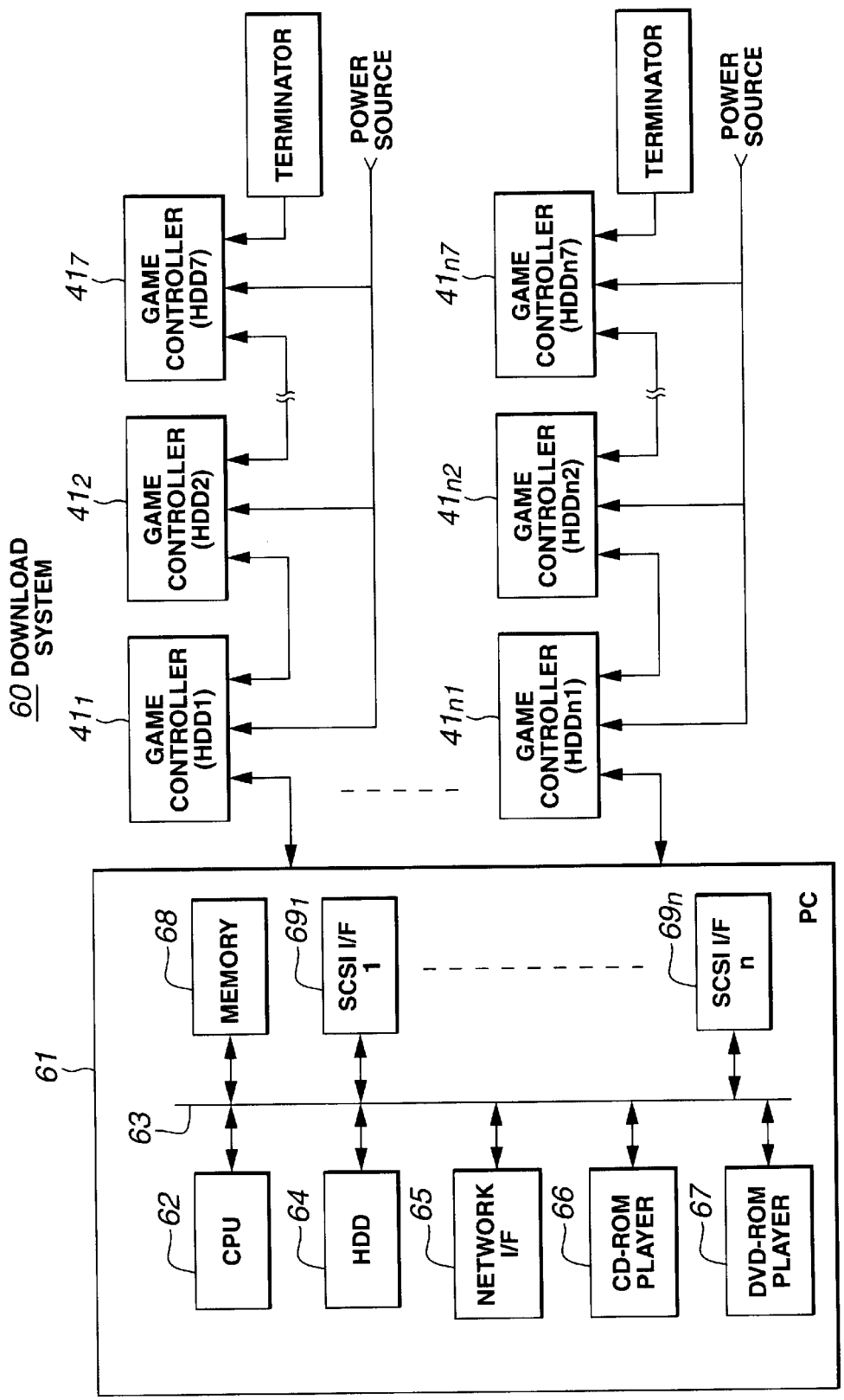
FIG. 16 is a diagram showing the structure of a system for executing a method of downloading a game software program to a plurality of game controllers.

A specific method of downloading the game software program to the game controller is shown in FIG. 16. This example is arranged to perform the download by using a download application program. A marketed personal computer (PC) 61 is employed as a server for the game software program. A SCSI interface $69_1$ is employed as the interface with the game controllers $41_1, 41_2, \ldots, 41_7$.

The PC 61 incorporates a CPU 62 to which a HDD 64, a network I/F 65, a CD-ROM player 66, a DVD-ROM player 67, a memory 68, such as a RAM, and SCSI I/F (#1) $69_1, \ldots,$ SCSI I/F (#n) $69_n$ are connected through an internal bus 63.

The CPU 62 executes an operating system program read from the HDD 64, the CD-ROM player 66 or the DVD-ROM player 67. When execution of the downloaded application program has been selected owing to the process performance in accordance with the operating system program, the program is read from the HDD 64, the CD-ROM player 66 or the DVD-ROM player 67 so as to install the program on the memory 68 so as to be executed by the CPU 62. The foregoing downloaded application program will be described later.

Not larger than 7 game controllers $41_1, 41_2, \ldots, 41_7$ can be connected to the SCSI I/F 69 of the PC 61. Therefore, when n SCSI I/F are prepared, n×7 game controllers can be connected. Thus, the game software program can be downloaded to n×7 game controllers. Setting of the ID to the n SCSI I/F is, as shown in FIG. 17, performed by simply depressing the connection connector to set the ID assigned to the connection connector.

Figure 18:
FIG. 18 is a diagram showing an example of display (download) on the monitor of a PC realized when a download application program has been executed by the download system shown in FIG. 16.

A process for executing the downloaded application program is performed by the download system shown in FIG. 16 will now be described with reference to FIG. 18. As shown in FIG. 16, the PC and n×7 game controllers, and then the power source of the PC is turned on. Thus, the downloaded application program is started on the PC. After the downloaded application program has been started, game software programs downloaded to the connected game controller are retrieved.

After the retrieval has been completed, download of the game software is performed or erase of the game software recorded on the controller is performed is selected by performing display on the monitor of the PC to select "1. download" or "2. erase" as the "game controller maintenance", as shown in FIG. 18(a). When "1. download" has been selected, a list of the game software programs recorded on in the PC is displayed as shown in FIG. 18(b). Thus, the game software required to be downloaded is selected. In this case, for example, "3. Japanese chess" and "6. base ball" are selected. After the selection has been performed, the decision button is depressed. When the decision button has been depressed, download is started. During the download, a fact that the download is being performed and a degree of completion of the download are indicated with "%" as shown in FIG. 18(c). After the download has been completed, the first screen shown in FIG. 18(a) is automatically displayed.

When "2. erase" is selected on the first screen shown in FIG. 18(a), a mode for erasing the game software is started. The foregoing mode is employed when new game software cannot be downloaded because the capacity of the recording medium included in the game controller, which is HDD in this embodiment, is filled with data or when the game controller is abolished.

When the erase is selected on the first screen, the list of the game software programs in the connected game controller is displayed on the monitor of the PC as shown in FIG. 19(d). Thus, a game erase screen with which the name of the game required to be erased is input is displayed on the monitor, as shown in FIG. 19(e). An assumption is made that erase of "chess" is selected. Thus, the color of the background for the selected game name "chess" is changed, as shown in FIG. 19(f). Then, a confirmation dialogue is displayed, as shown in FIG. 19(g). Also display "erase of selected game permitted ?" is performed. The confirmation button and the cancel button are operated to perform the confirmation. When the confirmation button has been depressed, the erase is performed. After erase has been completed, the display of the list is restored. When the completion button has been depressed on the list display screen, the menu screen shown in FIG. 18(a) is again displayed.

Therefore, the download system 60 according to this embodiment enables game software to be downloaded to a multiplicity of (n×7) game controllers by using the SCSI I/F of the PC. That is, the foregoing video game system is arranged to download the game software program on the off-line. Therefore, change can quickly be performed.

Figure 20:
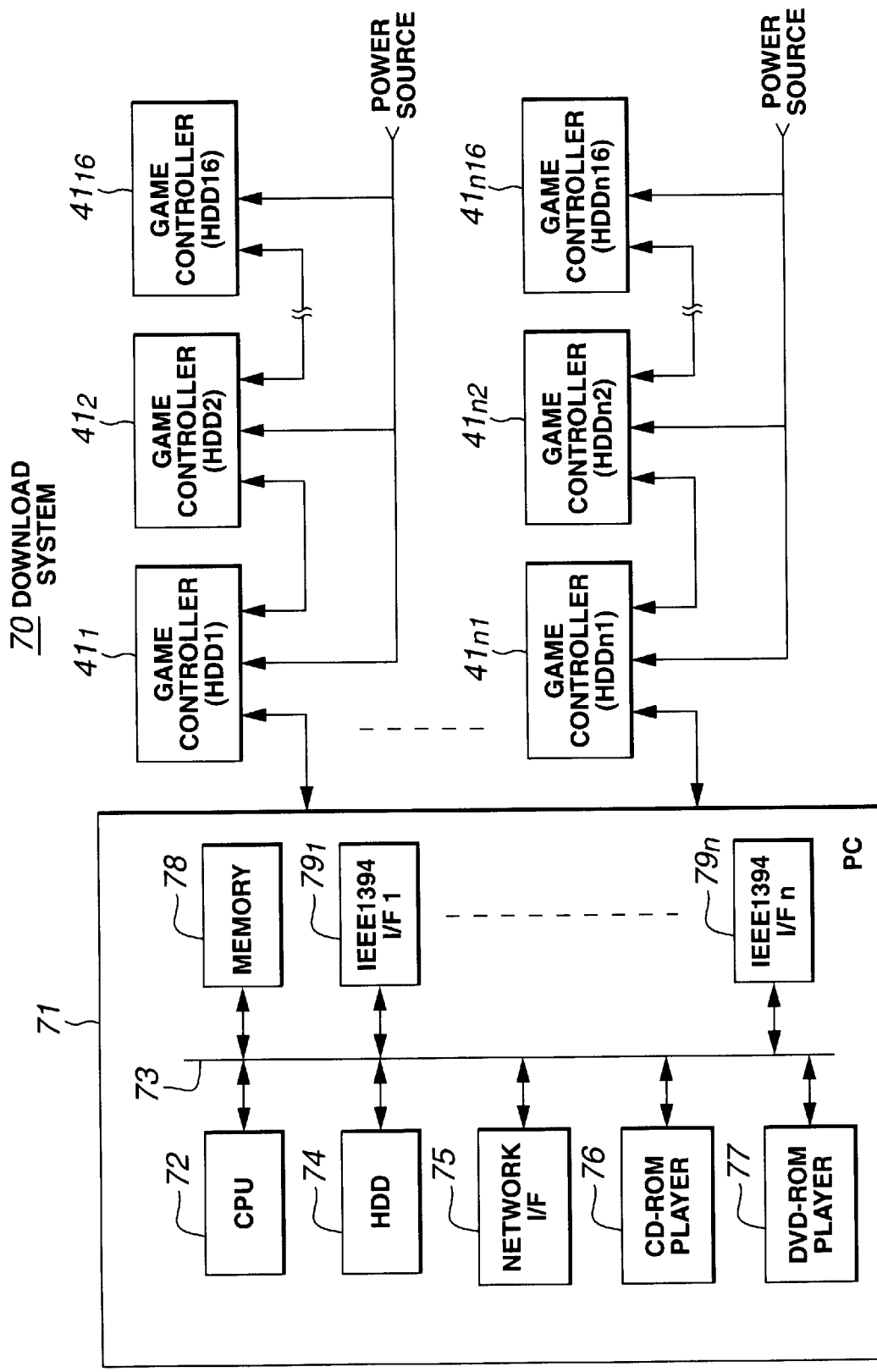
FIG. 20 is a block diagram showing another structure of the system for executing the method of downloading a game software program to a plurality of the game controllers.

FIG. 20 shows another embodiment for downloading the game software program to the game controller. Also this embodiment is arranged to perform the download by executing a download application program. The interface between the game controller and the PC is established by IEEE 1394 interface.

In the download system 70, a PC 71 incorporates a CPU 72 to which a HDD 74, a network I/F 75, a CD-ROM player 76, a DVD-ROM player 77, a memory 78, such as a RAM and IEEE 1394 I/F (#1) $79_1$, . . . , IEEE 1394 I/F (#n) $79_n$ are connected through an internal bus 73. The structures and operations of the CPU 72, the HDD 74, the network I/F 75, the CD-ROM player 76, the DVD-ROM player 77 and the memory 78 of the PC 71 are similar to those in the PC 61 shown in FIG. 16.

A 16 or smaller number of $41_1$, $41_2$, . . . , $41_{16}$ can be connected to the IEEE 1394 I/F per bus. Therefore, when n IEEE 1394 I/F are prepared, n×16 game controllers can be connected. Thus, the game software program can simultaneously be downloaded to n×16 game controllers.

The process for executing the foregoing downloaded application program by the download system shown in FIG. 20 is similar to that described with reference to FIGS. 18 and 19.

Therefore, the download system 70 according to this embodiment enables the game software to be downloaded to a multiplicity of (n×16) game controllers by using the IEEE 1394 I/F. That is, the game software program is downloaded with respect to the video game video game system by the off-line method. Therefore, quick change is permitted.

Note that the present invention is not limited to only the application to the video game system. The present invention may be applied to a train or a lodging.

According to the present invention, the video game software is selected by a passenger or a lodger such that the load which must be borne by the distributor side is reduced. The video game can be played to immediately respond to a request.

According to the present invention, passengers of a movable body at distant seats are able to play the competitive-type game without a necessity of using a costly network.

According to the present invention, game software can simultaneously and quickly be downloaded to a multiplicity of game controllers.

What is claimed is:

1. A game controller for an entertainment system coupled to a game machine body, the game controller comprising:
   a key operation portion;
   communication interface means for establishing a communication with the game machine body; and
   storage means in which a plurality of game software programs is stored, wherein a particular game software program is selected from said plurality of game software programs using said key operation portion, and said particular game software program is executed by a control portion of said game machine body.

2. A game controller according to claim 1, wherein an index of the plurality of game software programs stored in said storage means is displayed as a list on display means connected to said game machine body.

3. A game controller according to claim 1, wherein said storage means is removable.

4. An entertainment system including a game machine body and a game controller, said entertainment system comprising:
   a game controller including:
      a key operation portion,
      a first communication interface means for establishing a communication with said game machine body, and
      a storage means in which a plurality of game software programs is stored, wherein a game software program is selected from said plurality of game software programs using said key operation portion; and
   a game machine body including:
      a second communication interface means for establishing a communication with said game controller, and
      a control means for executing said selected game software program.

5. An entertainment system according to claim 4, wherein an index of the plurality of game software programs stored in said storage means of said game controller is displayed as a list on display means connected to said game machine body.

6. An entertainment system according to claim 4, wherein said storage means is removable.

7. A method of executing a game on a game machine body, the method comprising:
   displaying an index of a plurality of game software programs stored in a storage medium of a game controller when the game controller is connected to the game machine body;
   selecting a particular game software program from said plurality of game software programs using a key operation portion of said game controller; and
   executing said particular game software program.

8. An entertainment system comprising:
   a plurality of game machine bodies;
   a plurality of game controllers, each game controller of said plurality of game controllers coupled to a corresponding game machine body of said plurality of game machine bodies;
   a network for connecting said plurality of game machine bodies to one another; and
   a main control portion for controlling said plurality of game machine bodies within said network, wherein said each game controller including:
      a key operation portion,
      a first communication interface means for establishing a communication with said game machine body, and
      a storage means having a plurality of game software programs stored therein,
      wherein a game software program is selected using said key operation portion; and
   said corresponding game machine body including:
      a second communication interface means for establishing a communication with said game controller, and a control means for executing the selected game software program when communication has been established between at least two game machine bodies of said plurality of game machine bodies, and when a predetermined game software program is executed by said main control portion such that synchronization is established.

9. An entertainment system according to claim 8, wherein said main control portion transmits a game competitor request command to all of residual game machine bodies when a predetermined game software program has been selected by any one of said game controller.

10. An entertainment system according to claim 9, wherein said main control portion connects a communication line between said game machine bodies when an acceptance notification has been issued from an unspecific competitor through an unspecific game machine body.

11. An entertainment system according to claim 10, wherein said main control portion causes said unspecific competitor to fetch a game software program similar to said predetermined game software program which is executed by said arbitrary game machine body from said game controller so that said game machine body starts the fetched game software program.

12. An entertainment system according to claim 11, wherein said main control portion causes said fetched game to be played such that the synchronization is established between said game machine bodies after said predetermined game software program has been started in said game machine bodies.

13. An entertainment system according to claim 8, wherein said predetermined game software program is a competitive-type game software program.

14. A method of executing a game such that a network for connecting a plurality of game machine bodies to which a game controller is connected is used to execute a predetermined game software program between an arbitrary game machine body and an unspecific game machine body, said method of executing a game comprising:

configuring said game controller with a storage means in which a plurality of game software programs is stored;

transmitting a request for playing the game to all of residual game machine bodies when a predetermined game software program has been selected by said game controller connected to said arbitrary game machine body and when a mode for retrieving an unspecific competitor has been selected;

connecting a communication line between said arbitrary game machine body and said unspecific game machine body when an acceptance notice has been issued from said unspecific competitor through said unspecific game machine body in response to said request for playing said game; and playing said game while synchronization between said game machine bodies is being established such that said unspecific game machine body fetches, from said game controller, a game software program similar to said game software program which is executed by said game machine body and said game machine body turns said unspecific game software program on.

15. A method of executing a game according to claim 14, wherein said predetermined game software program is a competitive-type game software program.

* * * * *